United States Patent [19]
Sudo et al.

[11] Patent Number: 5,935,887
[45] Date of Patent: Aug. 10, 1999

[54] CERAMIC FILTER AND METHOD FOR PREPARING SAME

[75] Inventors: Eiichi Sudo; Nobuhiro Okuzono, both of Fukuoka, Japan

[73] Assignee: Mitsui Mining and Smelting Co., Ltd., Tokyo, Japan

[21] Appl. No.: 09/049,986

[22] Filed: Mar. 30, 1998

[30] Foreign Application Priority Data

Apr. 16, 1997 [JP] Japan ................................. 9-098873

[51] Int. Cl.$^6$ ................................... B01D 24/00
[52] U.S. Cl. .......................... 501/80; 501/125; 501/127; 501/128; 501/17; 501/21; 501/32; 210/496; 210/500.25; 210/500.26; 210/510.1
[58] Field of Search ................................ 501/125, 17, 21, 501/32, 80, 128, 39, 77, 127; 210/510.1, 496, 500.25, 500.26

[56] References Cited

U.S. PATENT DOCUMENTS

| | | |
|---|---|---|
| 3,524,548 | 8/1970 | McDonald et al. . |
| 3,939,079 | 2/1976 | Uchiyama et al. ................... 210/510.1 |
| 5,114,882 | 5/1992 | Sugiyama et al. ......................... 501/17 |
| 5,145,806 | 9/1992 | Shirakawa et al. ....................... 501/80 |
| 5,152,893 | 10/1992 | Shiraishi et al. ...................... 210/510.1 |
| 5,667,685 | 9/1997 | Yoshida et al. ....................... 210/510.1 |

FOREIGN PATENT DOCUMENTS

| | | |
|---|---|---|
| 47-36347 | 9/1972 | Japan . |
| 2-34732 | 2/1990 | Japan . |
| 4-231425 | 8/1992 | Japan . |
| 5-138339 | 6/1993 | Japan . |
| 5-86459 | 12/1993 | Japan . |
| 5-86460 | 12/1993 | Japan . |
| 9-29423 | 2/1997 | Japan . |

*Primary Examiner*—Michael Marcheschi
*Attorney, Agent, or Firm*—Young & Thompson

[57] ABSTRACT

A ceramic filter for filtering molten metals includes aggregate particles consisting of fused alumina and/or sintered alumina, and a binder material, wherein the binder is present in an amount of 10 to 22 parts, by weight, per 100 parts of the aggregate particles. The binder material consists of 15 to 25%, by weight, of $Al_2O_3$, 35 to 52% of $B_2O_3$, not less than 7% and less than 15% of $SiO_2$, and the balance of MgO. The ceramic filter may be prepared by kneading 100 parts of aggregate particles consisting essentially of either or both of fused alumina and sintered alumina, 10 to 22 parts of the foregoing binder material, an appropriate amount of an organic binder and an appropriate amount of water; molding the resulting mixture; drying the molded mixture; and then firing the same at a temperature ranging from 1150 to 1300° C.

4 Claims, 1 Drawing Sheet

CERAMIC FILTER AND METHOD FOR PREPARING SAME

BACKGROUND OF THE INVENTION (a) Field of the Invention

The present invention relates to a ceramic filter used for removing, for instance, non-metallic inclusions which are mixed in or present in molten metals, in particular, a molten metal of aluminum or an aluminum alloy (generically, both of them will herein simply be referred to as "aluminum molten metal") as well as a method for preparing the ceramic filter.

(b) Description of the Prior Art

In general, foreign substances such as non-metallic inclusions are mixed in molten metals, such as the aluminum molten metal. The presence of these foreign substances causes processing problems such as formation of hard spots during casting. For this reason, these foreign substances should desirably be removed from the molten metals prior to the casting to thus improve the quality of the resulting cast articles and to eliminate any trouble possibly observed during post-processing steps. To this end, the molten metal has been pre-treated through filtration and there have been known a variety of devices used for filtering the molten metal, for instance, such a tube filter produced by sintering with an inorganic binder as disclosed in Japanese Examined Patent Publication (hereinafter referred to as "J.P. KOKOKU") No. Sho 52-22327.

In most of such conventional filters, however, large amounts of $SiO_2$ and/or CaO are included in the binders used therein and as a result, Si and/or Ca present in the binder may be released into the aluminum molten metal to thus contaminate the molten metal. In addition, the hot bending strengths of these filters (as determined at 800° C.) are low, on the order of about 3 MPa, and this may damage the filters during filtering a molten metal having a high temperature.

Filters whose binder is free of any $SiO_2$ and which are, accordingly free of any release of Si into the aluminum molten metal are disclosed in J.P. KOKOKU Nos. Hei 5-86459 and Hei 5-86460 and Japanese Un-Examined Patent Publication (hereinafter referred to as "J.P. KOKAI") No. Hei 2-34732. These filters do not suffer from such a drawback as the contamination of the molten metal due to the release of Si, but they suffer from various other problems. For instance, they are inferior in the ability of passing the aluminum molten metal therethrough, easily cause clogging and they show scattering in the treated amount of the molten metal because of low wettability of the filters by the aluminum molten metal. In addition, the initial pressure head of the aluminum molten metal becomes high and accordingly, the filtering device must sometimes be improved. Moreover, these filters may be damaged during using the same since they have low strength because of insufficient bonding of aggregates through such a binder.

Under such circumstances, there are disclosed filters which make use of a binder containing a desired amount of $SiO_2$ in, for instance, J.P. KOKAI Nos. Hei 5-138339 and Hei 9-29423, in order to solve these problems such as the release of Si and/or the clogging of these filters. In the filter disclosed in J.P. KOKAI No. Hei 5-138339, however, the binder used comprises a large amount of a crystalline component and this leads to the formation of a highly viscous binder having poor flowability and, in turn, to the localization of the binder on the aggregates surface and the formation of uneven aggregate surface. Accordingly, if the aggregate particles are small, the unevenness of the aggregate surface often results in clogging of pores of the filter and the clogging thus makes the passage of the aluminum molten metal therethrough difficult. Furthermore, the binder comprises 15 to 25% of $SiO_2$, this in turn requires the sintering at a temperature of higher than 1300° C. to prevent any reduction in the hot strength of the resulting filter. In this case, however, gross crystals are present in the binder and this leads to a decrease in the resistance of the filter to the corrosion by the aluminum molten metal.

The filter disclosed in the foregoing J.P. KOKAI No. Hei 9-29423 may cause contamination of the aluminum molten metal during using the same because of the relatively high $SiO_2$ content, on the order of 25 to 35% by weight, of the binder used therein. Moreover, the hot bending strength (at 800° C.) of the resulting filter is reduced and this may accordingly result in crushing thereof during filtering a molten metal having a high temperature.

Moreover, J.P. KOKAI No. Hei 4-231425 discloses a filter having high hot bending strength. The binder used in this ceramic filter comprises 2 to 6% by weight of $SiO_2$, 1 to 10% by weight of MgO, 1 to 8% by weight of $TiO_2$ and the balance of $Al_2O_3$. In other words, the $SiO_2$ content of the binder is low and accordingly, the filter has low wettability with the aluminum molten metal. For this reason, this makes the passage of the aluminum molten metal therethrough difficult and may lead to insufficiency in the amount of the filtered molten metal and a rise of the initial pressure head of the aluminum molten metal. This may, in turn, sometimes require the improvement of the filtering device. In addition, the binder material has a high viscosity and insufficient flowability and this makes the production of uniform filters difficult and the resulting filter is liable to easily cause clogging. Accordingly, problems of, for instance, unstable throughput of the filter arise.

J.P. KOKOKU No. Sho 47-36347 discloses a filter produced using a binder essentially consisting of 15 to 80% by weight of $B_2O_3$, 5 to 50% by weight of CaO, 2 to 60% by weight of $Al_2O_3$ and not more than 10% by weight of $SiO_2$. The CaO present in the binder is not reactive with aluminum, but the CaO per se may easily be mixed in the aluminum molten metal and the CaO mixed in the molten metal would become a cause of, for instance, crack-formation (selvage cracks). Therefore, the binder used is preferably free of any CaO.

SUMMARY OF THE INVENTION

Accordingly, it is an object of the present invention to provide a ceramic filter for filtering molten metals, which is free of the foregoing drawbacks, more specifically to provide a ceramic filter which may cause only slight release of Si and/or Ca from a binder used in the filter and penetration thereof into molten metals such as an aluminum molten metal, which is excellent in the room temperature bending strength and hot bending strength (at 800° C.), which does not cause any clogging of the aluminum molten metal because of good wettability therewith and the ability thereof to pass the molten metal therethrough and which can ensure approximately uniform filtration throughput.

Another object of the present invention is to provide a method for preparing the foregoing ceramic filter.

The inventors of this invention have conducted various investigations to accomplish the foregoing objects, have found out that these objects can effectively be attained by using MgO, instead of CaO, as an ingredient for the inorganic binder material which constitutes a ceramic filter and using specific amounts of $Al_2O_3$, $B_2O_3$, $SiO_2$ and MgO and that a ceramic filter, which is excellent in the hot bending strength and filtering characteristics and which may cause only slight release of Si from the binder and penetration thereof into the aluminum molten metal, can be obtained by sintering aggregates particles and the binder material at a sintering temperature ranging from 1150 to 1300° C. and thus have completed the present invention on the basis of these findings.

According to an aspect of the present invention, there is thus provided a ceramic filter for filtering molten metals, which comprises aggregate particles consisting essentially of either or both of fused alumina and sintered alumina, and a binder material, wherein the binder is present in an amount of 10 to 22 parts by weight per 100 parts by weight of the aggregate particles and the binder material comprises 15 to 35% by weight of $Al_2O_3$, 35 to 52% by weight of $B_2O_3$, not less than 7% by weight and less than 15% by weight of $SiO_2$ and the balance of MgO.

According to another aspect of the present invention, there is also provided a method for preparing the ceramic filter for filtering molten metals according to the present invention and the method comprises the steps of kneading 100 parts by weight of aggregate particles consisting essentially of either or both of fused alumina and sintered alumina, 10 to 22 parts by weight of a binder material which comprises 15 to 35% by weight of $Al_2O_3$, 35 to 52% by weight of $B_2O_3$, not less than 7% by weight and less than 15% by weight of $SiO_2$ and the balance of MgO, an appropriate amount of an organic binder and an appropriate amount of water; molding the resulting mixture, drying the molded mixture and then firing the same at a temperature ranging from 1150 to 1300° C.

DESCRIPTION OF THE PREFERRED EMBODIMENTS

Figure 1:
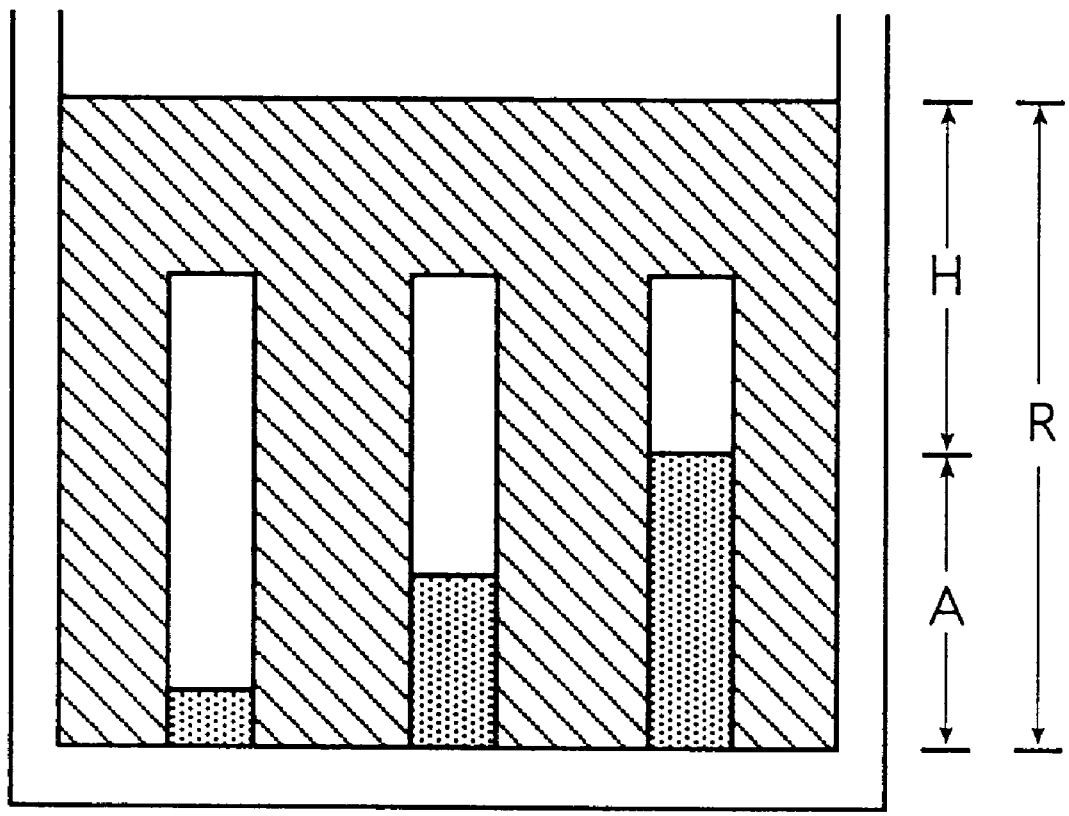
FIG. 1 is a schematic diagram showing a method for inspecting a filter for its aluminum molten metal-permeability.

In the ceramic filters for filtering molten metals, there have generally been used, for instance, aggregate particles such as those comprising silicon carbide, silicon nitride, fused alumina and sintered alumina. However, the ceramic filter for filtering molten metals according to the present invention comprises aggregate particles consisting essentially of either or both of fused alumina and sintered alumina which have excellent resistance to the corrosive action of molten metals, in particular, the aluminum molten metal.

The ceramic filter for filtering molten metals according to the present invention comprises the inorganic binder material in an amount ranging from 10 to 22 parts by weight per 100 parts by weight of the aggregate particles. This is because if the amount thereof is less than 10 parts by weight, the aggregate particles are insufficiently bonded together and as a result, the aggregate particles may partially fall off from the ceramic filter. On the other hand, if it exceeds 22 parts by weight, the pores formed between the aggregate particles are too narrow and thus the filter is liable to cause clogging.

The inorganic binder material which is a constituent of the ceramic filter of the invention comprises, based on the total weight of the binder material, 15 to 35% by weight of $Al_2O_3$. This is because if the $Al_2O_3$ content thereof is less than 15% by weight, such a binder material has a low viscosity, the binder would undergo downward flow during the firing process for preparing the ceramic filter and thus it is difficult to form any uniform ceramic filter. On the other hand, if the $Al_2O_3$ content exceeds 35% by weight, the bending strength of the resulting ceramic filter is substantially reduced and as a result, the filter may be crushed during using the same. In the present invention, the $Al_2O_3$ content of the inorganic binder material preferably ranges from 20 to 30% by weight.

The inorganic binder material which is a constituent of the ceramic filter of the invention comprises, based on the total weight of the binder material, 35 to 52% by weight of $B_2O_3$. This is because if the $B_2O_3$ content of the binder material is less than 35% by weight, such a binder material has a high viscosity and poor flowability, the binder material is localized or non-uniformly distributed in the aggregate material during production of the ceramic filter, this leads to the local formation of narrow pores and the resulting filter has thus insufficient strength. On the other hand, if the $B_2O_3$ content exceeds 52% by weight, such a binder material has a low viscosity, the binder would undergo downward flow during the firing process for preparing the ceramic filter and thus it is difficult to form any uniform ceramic filter. In the present invention, the $B_2O_3$ content of the inorganic binder material preferably ranges from 40 to 50% by weight.

The inorganic binder material which is a constituent of the ceramic filter of the invention comprises, based on the total weight of the binder material, not less than 7% by weight and less than 15% by weight of $SiO_2$. The $SiO_2$ component serves to reduce the viscosity of the binder material, to promote the vitrification of the binder and to thereby increase the wettability of the resulting filter with an aluminum molten metal. If the $SiO_2$ content is less than 7% by weight, the resulting ceramic filter is insufficient in the wettability with the aluminum molten metal and also insufficient in the room temperature bending strength. On the other hand, if the $SiO_2$ content is not less than 15% by weight, the resulting ceramic filter has good wettability with the aluminum molten metal and high room temperature bending strength, the hot bending strength thereof (at 800° C.) is substantially reduced, the binder is replaced with the aluminum molten metal and thus the binder may easily be mixed with the molten metal. In the present invention, the $SiO_2$ content of the inorganic binder material preferably ranges from 10 to 14% by weight.

The inorganic binder material which is a constituent of the ceramic filter of the invention comprises MgO which is added thereto for controlling the viscosity of the binder material. The MgO constitutes the remainder of the binder material. In the present invention, the binder material comprises MgO, but is free of CaO which may be a contaminant for the aluminum molten metal.

The method for preparing a ceramic filter for filtering molten metals according to the present invention comprises the steps of kneading aggregate particles, a binder material, an organic binder and water; molding the resulting mixture; drying the molded mixture; and firing the same, like the conventional ceramic filter-production method, but is characterized in that a binder having a specific composition is used and that the molded mixture is fired at a specific firing temperature range. More specifically, a specific binder is used, which comprises 15 to 35% by weight of $Al_2O_3$, 35 to 52% by weight of $B_2O_3$, not less than 7% by weight and less than 15% by weight of $SiO_2$ and the balance of MgO and the molded mixture is fired at a temperature ranging from 1150 to 1300° C.

If the firing temperature is less than 1150° C., the foregoing inorganic binder material is not sufficiently molten and the binder accordingly has a high viscosity and poor flowability. Thus, the binder material is localized or non-uniformly distributed in the aggregate material during production of the ceramic filter, this leads to the local formation of narrow pores and the resulting ceramic filter has insufficient strength. On the other hand, if the firing temperature is higher than 1300° C., $B_2O_3$ present in the binder material is easily evaporated. Therefore, it is difficult to produce uniform ceramic filters, gross crystalline phases are formed in the binder materials, the density thereof produced is reduced and accordingly, the inorganic binder exhibits low resistance to the aluminum molten metal. In the production method of the present invention, the firing temperature preferably ranges from 1200 to 1250° C.

As has been discussed above in detail, the ceramic filter for filtering molten metals according to the present invention is excellent in the room temperature bending strength, the hot bending strength (at 800° C.), the resistance to the aluminum molten metal (the amount of the released components) and the ability thereof to pass the aluminum molten metal therethrough (the molten aluminum-permeability).

The present invention will further be described in detail below with reference to the following working Examples and Comparative Examples, but the present invention is not restricted to these specific Examples at all.

EXAMPLES 1 TO 13 AND COMPARATIVE EXAMPLES 1 TO 10

In these examples, there were used A-type abrasive grains (fused alumina) #24 defined in JIS R6001 as the aggregate particles; binder materials having compositions as shown in Table 1 or Table 2 as the inorganic binder materials; and dextrin and isobutyl-maleic anhydride copolymers as the organic binders. Each preparation was obtained by mixing the aggregate particles with the binder material in a mixing ratio as specified in Table 1 or 2 and further adding 1.3% by weight of dextrin and 1.3% by weight of an isobutyl-maleic anhydride copolymer as the organic binder, and 3.2% by weight of water to the resulting mixture. Each preparation was kneaded, molded, dried and then fired at a temperature specified in Table 1 or 2 to give a rectangular prism-like specimen having a size of 100 mm×20 mm×18 mm and a pipe-like specimen having an outer diameter of 100 mm, an inner diameter of 60 mm and a height of 650 mm. These specimens obtained in Examples 1 to 13 and Comparative Examples 1 to 10 were inspected for the following characteristic properties according to the test methods specified below.

Bending Strength

Each rectangular prism-like specimen having a size of 100 mm×20 mm×18 mm was inspected for the room temperature bending strength according to the two-point-support one-point-loading system at a supporting span of 90 mm. On the other hand, each rectangular prism-like specimen was likewise inspected for the hot bending strength by holding the specimen at 800° C. for 15 minutes in an electric furnace for establishing a desired atmospheric temperature and then determining the hot bending strength in the electric furnace according to the two-point-support one-point-loading system at a supporting span of 90 mm. The results thus obtained are summarized in the following Table 1 and 2.

Released Amounts of Components

Each specimen was immersed in a highly pure (not less than 99.99%) aluminum molten metal maintained at 740° C. in an amount of one part by weight per 10 part by weight of the molten aluminum and then maintained at that temperature for 72 hours. Thereafter, a sample was collected from the aluminum molten metal to thus inspect the sample for the contents of Si, B and Mg present therein and the resulting data were compared with those observed for the aluminum molten metal prior to the immersion to determine the difference (increment) between the contents of each element, which was herein defined to be the "released amount of each component". These results thus obtained are listed in the following Tables 1 and 2.

Aluminum Permeability

The ceramic filters obtained in Examples 1 to 13 and Comparative Examples 1 to 10 were inspected for their molten aluminum-permeability according to the following method. More specifically, each pipe-like specimen having an outer diameter of 100 mm, an inner diameter of 60 mm and a height of 650 mm was preheated while vertically standing it on the bottom of a furnace for holding the aluminum molten metal and then a highly pure (not less than 99.99%) aluminum molten metal maintained at 740° C. was poured into the furnace at a height of about 70 cm, followed by maintaining the molten metal at that temperature for 24 hours. Then each specimen was withdrawn from the furnace, followed by cooling the same, cutting it along the longitudinal direction of the specimen (i.e., the vertical direction thereof observed when standing it in the furnace) and determining the height (A) of the aluminum molten metal which had been penetrated into each pipe (hereinafter referred to as "aluminum-penetration height"). The difference between the level (R) of the aluminum molten metal in the furnace and the aluminum-penetration height (A) (i.e., (R−A)) is herein defined to be the height (H) required for aluminum-immersion ("required aluminum-immersion height"). The method for inspecting the aluminum permeability is summarized in the attached FIG. 1. In this connection, the lower the required aluminum-immersion height (H), the higher the aluminum permeability of the corresponding ceramic filter. The results thus determined are also summarized in the following Tables 1 and 2.

Overall Evaluation

The foregoing observed data, i.e., the test results of the bending strength measurements, the released amount of each component and the aluminum permeability were subjected to the overall evaluation according to the following three evaluation criteria:

◎: All of these three characteristic properties are satisfied;

○: One of these characteristic properties falls within the corresponding borderline region thereof and the other properties are satisfied; and X: At least one of these properties is unsatisfied.

In case of Comparative Example 2, however, the ceramic filter may practically be used since the filter was not sufficient in the aluminum permeability, but was exceptionally excellent in the bending strength and the released amounts of the components fell within the borderline regions. Therefore, the filter was evaluated to be Δ.

TABLE 1

| Example No. | 1 | 2 | 3 | 4 | 5 | 6 | 7 | 8 | 9 | 10 | 11 | 12 | 13 |
|---|---|---|---|---|---|---|---|---|---|---|---|---|---|
| Composition of Inorganic Bainder Material (% by weight) | | | | | | | | | | | | | |
| $SiO_2$ | 14 | 12 | 12 | 10 | 10 | 10 | 10 | 10 | 8 | 8 | 14 | 14 | 8 |
| $B_2O_3$ | 40 | 45 | 50 | 50 | 50 | 50 | 50 | 45 | 47 | 44 | 35 | 48 | 45 |
| $Al_2O_3$ | 30 | 25 | 20 | 20 | 20 | 20 | 20 | 25 | 25 | 30 | 29 | 15 | 35 |
| MgO | 16 | 18 | 18 | 20 | 20 | 20 | 20 | 20 | 20 | 18 | 22 | 23 | 12 |
| Added Amount (% by weight) | 15 | 15 | 15 | 15 | 10 | 20 | 15 | 15 | 15 | 15 | 15 | 15 | 15 |
| Firing Temperature (° C.) | 1250 | 1250 | 1250 | 1250 | 1250 | 1250 | 1200 | 1250 | 1250 | 1250 | 1250 | 1250 | 1250 |
| Bending Strength (MPa) | | | | | | | | | | | | | |
| at room temp. | 9.7 | 10.9 | 10.4 | 11.9 | 7.5 | 15.0 | 9.7 | 10.5 | 9.9 | 7.8 | 10.0 | 10.8 | 7.3 |
| at 800° C. | 7.1 | 7.0 | 8.8 | 12.2 | 7.0 | 12.8 | 8.0 | 10.4 | 10.4 | 9.5 | 6.8 | 7.4 | 7.5 |
| Released Amount of Component (ppm) | | | | | | | | | | | | | |
| Si | 18 | 15 | 14 | 13 | 10 | 17 | 9 | 13 | 11 | 10 | 20 | 18 | 13 |
| B | 10 | 10 | 10 | 11 | 8 | 14 | 5 | 12 | 6 | 6 | 12 | 10 | 10 |
| Mg | 5 | 7 | 5 | 4 | 5 | 6 | 2 | 4 | 4 | 5 | 3 | 4 | 5 |
| Required Aluminum-Immersion Height (cm) | 34 | 36 | 37 | 38 | 35 | 45 | 40 | 41 | 39 | 40 | 37 | 37 | 42 |
| Overall Evaluation | ○ | ◉ | ◉ | ◉ | ○ | ◉ | ◉ | ◉ | ◉ | ○ | ○ | ◉ | ○ |

TABLE 2

| Comparative Example No. | 1 | 2 | 3 | 4 | 5 | 6 | 7 | 8 | 9 | 10 |
|---|---|---|---|---|---|---|---|---|---|---|
| Composition of Inorganic Bainder Material (% by weight) | | | | | | | | | | |
| $SiO_2$ | 10 | 10 | 20 | 5 | 12 | 10 | 12 | 12 | 10 | 10 |
| $B_2O_3$ | 50 | 50 | 40 | 45 | 30 | 55 | 50 | 35 | 50 | 50 |
| $Al_2O_3$ | 20 | 20 | 25 | 30 | 35 | 20 | 10 | 40 | 20 | 20 |
| MgO | 20 | 20 | 15 | 20 | 23 | 15 | 28 | 13 | 20 | 20 |
| Added Amount (% by weight) | 7 | 25 | 15 | 15 | 15 | 15 | 15 | 15 | 15 | 15 |
| Firing Temperature (° C.) | 1250 | 1250 | 1250 | 1250 | 1250 | 1250 | 1250 | 1250 | 1350 | 1100 |
| Bending Strength (MPa) | | | | | | | | | | |
| at room temp. | 4.4 | 17.0 | 15.2 | 5.0 | 7.0 | 9.8 | 6.2 | 4.2 | 6.8 | 4.2 |
| at 800° C. | 3.8 | 13.0 | 4.2 | 4.3 | 3.9 | 2.5 | 3.2 | 2.8 | 7.3 | 2.3 |
| Released Amount of Component (ppm) | | | | | | | | | | |
| Si | 11 | 21 | 60 | 10 | 132 | 15 | 63 | 110 | 408 | 13 |
| B | 10 | 17 | 39 | 9 | 80 | 8 | 33 | 82 | 201 | 12 |
| Mg | 6 | 10 | 20 | 5 | 48 | 6 | 26 | 58 | 90 | 7 |
| Required Aluminum-Immersion Height (cm) | 32 | 55 | 37 | 64 | 40 | 42 | 40 | 42 | 44 | 61 |
| Overall Evaluation | X | Δ | X | X | X | X | X | X | X | X |

As has been clear from the data listed in Tables 1 and 2, the ceramic filters prepared in Examples 1 to 13 according to the present invention have room temperature bending strength and hot bending strength (at 800° C.); resistance to corrosion by the aluminum molten metal (the released amounts of components); and ability to pass the aluminum molten metal therethrough (molten aluminum-permeability) comparable to or superior to those observed for the ceramic filters according to Comparative Examples and thus have high practical applicability.

On the other hand, the ceramic filters prepared in Comparative Examples 1 and 2 wherein the amount of the binder incorporated with respect to the aggregate material is beyond the scope of the present invention; those prepared in Comparative Examples 3 and 4 wherein the $SiO_2$ content of the binder is beyond the scope of the present invention; those prepared in Comparative Examples 5 and 6 wherein the $B_2O_3$ content of the binder is beyond the scope of the present invention; and those prepared in Comparative Examples 7 and 8 wherein the $Al_2O_3$ content of the binder is beyond the scope of the present invention each is extremely insufficient in at least one of the room temperature bending strength and the hot bending strength (at 800° C.); the resistance to corrosion by the aluminum molten metal; and the ability thereof to pass the aluminum molten metal therethrough and they do not have any practical applicability except for that produced in Comparative Example 2. The ceramic filter produced in Comparative Example 9, wherein the firing temperature is too high on the order of 1350° C., is insufficient in the resistance to corrosion by the aluminum molten metal and the filter produced in Comparative Example 10, wherein the firing temperature is too low on the order of 1100° C., is insufficient in the bending strength.

What is claimed is:

1. A ceramic filter for filtering molten metals which comprises aggregate particles consisting essentially of either or both of fused alumina and sintered alumina, and a binder material, wherein the binder is present in an amount of 10 to 22 parts by weight per 100 parts by weight of the aggregate particles and wherein the binder material consists of 15 to 35% by weight of $Al_2O_3$, 35 to 52% by weight of $B_2O_3$, not less than 7% by weight to 14% by weight of $SiO_2$ and the balance of MgO.

2. The ceramic filter according to claim 1 wherein the binder material consists of 20 to 30% by weight of $Al_2O_3$, 40 to 50% by weight of $B_2O_3$, 10 to 14% by weight of $SiO_2$ and the balance of MgO.

3. A method for preparing a ceramic filter used in filtration of molten metals comprising the steps of kneading 100 parts by weight of aggregate particles consisting essentially of either or both of fused alumina and sintered alumina, 10 to 22 parts by weight of a binder material which consists of 15 to 35% by weight of $Al_2O_3$, 35 to 52% by weight of $B_2O_3$, not less than 7% by weight to 14% by weight of $SiO_2$ and the balance of MgO, and an amount of an organic binder and an amount of water sufficient to provide a moldable mixture; molding the resulting mixture; drying the molded mixture; and then firing the molded mixture at a temperature ranging from 1150 to 1300° C.

4. The method according to claim 3 wherein the binder material consists of 20 to 30% by weight of $Al_2O_3$, 40 to 50% by weight of $B_2O_3$, 10 to 14% by weight of $SiO_2$ and the balance of MgO.

* * * * *